(12) United States Patent
Haupt

(10) Patent No.: US 7,971,679 B2
(45) Date of Patent: Jul. 5, 2011

(54) POWER STEERING SYSTEM

(75) Inventor: Jens Haupt, Oberursel (DE)

(73) Assignee: Nexteer (Beijing) Technology Co., Ltd.

( * ) Notice: Subject to any disclaimer, the term of this patent is extended or adjusted under 35 U.S.C. 154(b) by 309 days.

(21) Appl. No.: 12/207,056

(22) Filed: Sep. 9, 2008

(65) Prior Publication Data

US 2009/0065286 A1  Mar. 12, 2009

(30) Foreign Application Priority Data

Sep. 10, 2007  (EP) .................... 07017686

(51) Int. Cl.
   *B62D 6/02* (2006.01)
   *B62D 5/06* (2006.01)
(52) U.S. Cl. ............ 180/422; 180/441; 180/446
(58) Field of Classification Search .......... 180/443, 180/444, 446, 422, 423; 701/41
   See application file for complete search history.

(56) References Cited

U.S. PATENT DOCUMENTS 5,749,431 A * 5/1998 Peterson ............ 180/422
5,771,989 A   6/1998 Sangret

FOREIGN PATENT DOCUMENTS

EP  05072996  9/1994
EP  1695893   8/2006

OTHER PUBLICATIONS

German language Search Report dated Dec. 28, 2007 issued in counterpart European Patent Application No. 07017686.2, and an English Translation of the Search Report.

* cited by examiner

*Primary Examiner* — Anne Marie M Boehler
(74) *Attorney, Agent, or Firm* — Cantor Colburn LLP

(57) ABSTRACT

A power steering system for a vehicle is described, wherein a magnetic or electromagnetic actuator, which can be acted on via a controller, is associated with a torsion bar connected to a steering wheel, and by which the torsional stiffness of the system is variable in dependence on the vehicle speed, the steering angle speed and/or the transverse acceleration. In this connection, the electrical power supply of the magnetic or electromagnetic actuator taking place via the controller is interrupted or reduced when a steering angle speed of zero is detected or when a steering angle speed of zero and a vehicle speed of zero are detected.

12 Claims, 1 Drawing Sheet

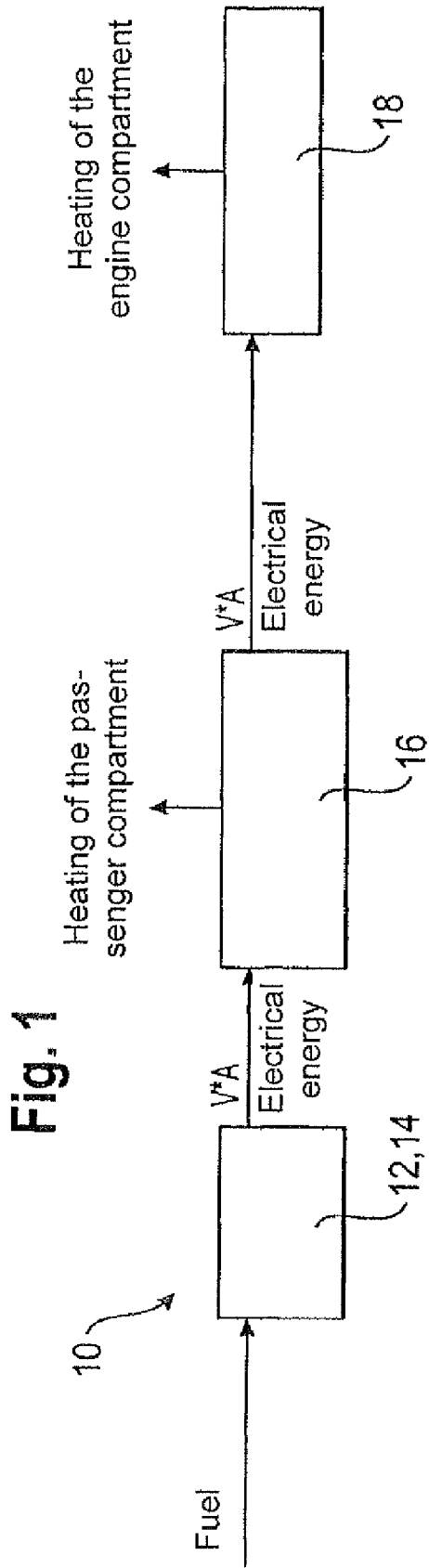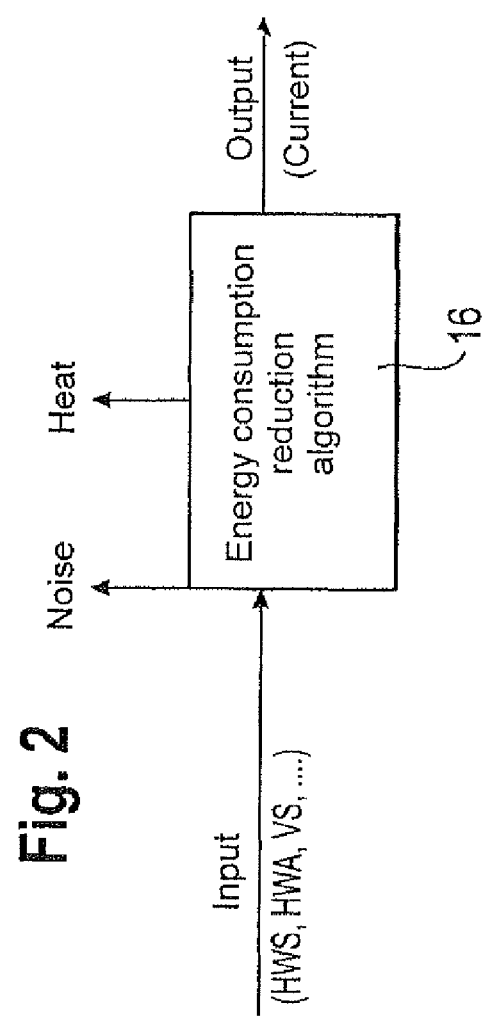

POWER STEERING SYSTEM

The subject patent application claims priority to and all the benefits of European Patent Application No. 07017686, which was filed on Sep. 10, 2007 with the European Patent Office.

The invention relates to a power steering system for a vehicle in which a magnetic or electromagnetic actuator, which can be acted on via a controller, is associated with a torsion bar connected to a steering wheel, and by which the torsional stiffness of the system can be varied in dependence on the vehicle speed, the steering angle speed and/or the transverse acceleration.

With such speed-regulated power steering systems, the maximum electrical system current amounts to approximately 3 to 5 amperes depending on the function. The output current can be set differently in dependence on different sensor signals such as in particular the vehicle speed, the transverse acceleration, the steering angle speed, etc. to vary the system coordination. These speed-regulated power steering systems include inter alia the so-called "Magnasteer" power steering which is equipped with a Magnasteer rack and pinion steering with speed-dependent steering force assistance, with the power force being increased or decreased by a magnetic field. In addition, with this power steering, the steering forces to be applied are also varied in dependence on measured transverse accelerations to provide the driver with feedback on the reactions of his vehicle.

In the previously usual power steering systems of the initially named kind, the coordination takes place such that, for example in a parked state, the system delivers the maximum negative output current, for example −3 amperes, and at higher speeds, the maximum positive output current, for example +3 amperes, to the magnetic or electromagnetic actuator. The different signs of the currents result through the different flow directions. The electromagnetic actuator is here therefore always supplied with the maximum current independently of the respective circumstances, which brings along unnecessary energy losses.

It is the underlying object of the invention to provide an improved power steering system of the initially named kind in which the energy losses are further reduced in a simple and reliable manner.

This object is satisfied in accordance with the invention in that the electrical power supply of the magnetic or electromagnetic actuator, which takes place via the controller, is interrupted or reduced when a steering angle speed of zero is detected or when a steering angle speed of zero and a vehicle speed of zero are detected.

The current delivered by the controller to the magnetic or electromagnetic actuator is considerably reduced over the service life of the controller based on this design, whereby the energy losses are correspondingly reduced. The controller can thus also be dimensioned correspondingly smaller.

The controller is preferably designed such that with a detected change in the steering angle speed starting from zero the supply of the magnetic or electromagnetic actuator with electrical power begins.

Expediently, the change speed of the electrical power supply at its respective start is selected in dependence on the vehicle speed, on the steering angle speed, on the angle of rotation of the steering wheel, on the transverse acceleration and/or the like.

In this connection, the change speed of the electrical power supply at its respective start is preferably selected to be higher at relatively higher vehicle speeds than at relatively lower vehicle speeds. It is thus ensured, on the one hand, that the system reacts fast enough at higher vehicle speeds, whereas, on the other hand, at relatively lower vehicle speeds, further energy can be saved with a correspondingly slower increase of the power supply.

In accordance with an expedient practical embodiment of the power steering system in accordance with the invention, a specific time duration can be preset within which the electrical power supply of the magnetic or electromagnetic actuator taking place via the controller can be coordinated with presettable system parameters after the respective start of said electrical power supply.

Advantageously, with a vehicle speed greater than zero, the electrical power supply of the magnetic or electromagnetic actuator taking place via the controller is interrupted or reduced as soon as an angle of rotation of the steering wheel of zero is detected.

If one is therefore driving on a straight road, for example, an electrical supply of the magnetic or electromagnetic actuator can be dispensed with, whereby energy is correspondingly saved. The power supply is, for example, started again when a movement of the steering wheel is detected. If one is driving on the highway at higher speeds, for example, as already mentioned, the change speed of the electrical power supply can then be selected to be correspondingly high at its respective start to ensure a sufficiently fast reaction of the system.

It is also in particular of advantage when the electrical power supply of the electromagnetic actuator taking place via the controller is interrupted or reduced as soon as a vehicle speed of zero and a steering angle speed of zero are detected. It is thus inter alia ensured that, for example, energy is not consumed unnecessarily in a parked state. The same applies to the case that the vehicle has to be stopped in front of traffic lights, for example.

It is also conceivable only to interrupt or reduce the electrical power supply of the magnetic or electromagnetic actuator taking place via the controller after a presettable time duration on a detected speed of rotation of the steering wheel of zero or in the case that a steering angle speed of zero and a vehicle speed of zero are detected.

In this connection, this time duration can again also be selected in dependence on the respective circumstances. It is thus, for example, conceivable to select the time duration to be longer with a detected steering angle speed of zero at relatively lower vehicle speeds than at relatively higher vehicle speeds. Further energy is thus saved, on the one hand, due to the faster shutting down at lower vehicle speeds, whereas, on the other hand, the required safety and steering feel are ensured at higher vehicle speeds.

The electrical power supply of the magnetic or electromagnetic actuators can generally also be shut down or activated in dependence on other sensor signals.

A noticeable reduction in the energy losses over the total service life of the controller results with the power steering system in accordance with the invention.

The invention will be explained in more detail in the following with reference to an embodiment and to the drawing; there are shown in this:

FIG. 1 a schematic representation of the energy transmission in a motor vehicle equipped with a power steering system; and FIG. 2 a schematic representation of an exemplary embodiment of the controller of the power steering system in accordance with the invention.

FIG. 1 shows the energy transmission in a motor vehicle equipped with a power steering system 10 in a schematic representation.

Accordingly, an internal combustion engine 12 with an associated generator 14 has to be provided with fuel in order inter alia to drive the generator 14 which supplies a controller 16 with electrical energy or power, with inter alia the winding of a magnetic or electromagnetic actuator 18 being supplied with electrical energy via said controller and said actuator being provided parallel to a torsion bar connected to the steering wheel of the vehicle. In this connection, this electromagnetic actuator 18 can be acted on via the controller 16 in order optionally to vary the torsional stiffness of the power steering system in dependence on the vehicle speed, the steering angle speed and/or the transverse acceleration. In this connection, the power steering system 10, can for example, include a rack and pinion steering having speed-dependent steering force assistance in which the power force is increased or reduced via a magnetic field.

As can be seen from FIG. 1, energy losses can, for example, occur in that the controller 16 in particular heats up the passenger compartment and the magnetic or electromagnetic actuator 18 in particular heats up the engine compartment of the vehicle. In addition, the unnecessary heating up of the passenger compartment brings along further energy losses since greater demands are put on the air conditioning and the fan.

Energy losses are now reduced in that the electrical power supply of the magnetic or electromagnetic actuator 18 taking place via the controller 16 is interrupted or reduced when a steering angle speed of zero is detected or when a steering angle speed of zero and a vehicle speed of zero are detected.

For this purpose, the controller 16 is designed such that it works on the basis of a corresponding energy consumption reduction algorithm.

FIG. 2 shows in a schematic representation an exemplary embodiment of a corresponding controller 16 of the power steering system 10 in accordance with the invention.

As can be recognized with reference to FIG. 2, the controller 16 controls and/or regulates the electrical power supplied to the magnetic or electromagnetic actuator 18 in dependence on input signals which include the steering angle speed HWS, the angle of rotation of the steering wheel HWA, the vehicle speed VS and/or the like. In this connection, the electrical power supplied to the magnetic or electromagnetic actuator (18) is controlled and/or regulated such that unnecessary energy losses are avoided over the service life of the controller 16 and thus also in particular a heating of the passenger compartment as well as an unnecessary noise development in the passenger compartment are avoided.

The controller 16 can in particular start the supply of the magnetic or electromagnetic actuator 18 with electrical power on a detected change of the steering angle speed starting from zero.

The change speed of the electrical power supply can be selected at its start in dependence on the vehicle speed VS, the steering angle speed HWS, the angle of rotation of the steering wheel HWA, the transverse acceleration and/or the like.

The change speed of the electrical power supply can be selected to be higher at its respective start at relatively higher vehicle speeds than at relatively lower vehicle speeds.

In addition, a specific time duration can be preset within which the electrical power supply of the magnetic or electromagnetic actuator 18 taking place via the controller 16 after its respective start can be coordinated with presettable system parameters.

The controller 16 or its energy consumption reduction algorithm can also in particular be designed such that, at a vehicle speed greater than zero, the electrical power supply of the electrical actuator 18 taking place via the controller 16 is interrupted or reduced as soon as an angle of rotation of the steering wheel or a steering angle speed of zero is detected.

An interruption or reduction of the electrical supply of the magnetic or electromagnetic actuator taking place via the controller 16 can above all also take place as soon as a vehicle speed of zero and a steering angle speed of zero are detected.

In particular, such an embodiment of the controller 16 with an associated algorithm is also conceivable in which the electrical power supply of the magnetic or electromagnetic actuator 18 required via the controller 16 is only interrupted or reduced after a presettable time duration at a detected steering angle speed of zero or in the case that a steering angle speed of zero and a vehicle speed of zero are detected.

In this connection, with a detected steering angle speed of zero, the time duration after which the power supply is interrupted or reduced can be selected to be longer for relatively lower vehicle speeds than for relatively higher vehicle speeds.

REFERENCE NUMERAL LIST 10 power steering system
12 internal combustion engine
14 generator or dynamo
16 controller
18 magnetic or electromagnetic actuator

The invention claimed is:

1. A power steering system for a vehicle comprising:
an actuator operable by a controller and associated with a torsion bar connected to a steering wheel, by which a torsional stiffness of the system is variable in dependence on at least one of a vehicle speed, a steering angle speed and a transverse acceleration;
an electrical power supply of the actuator is modified when a steering angle speed of zero is detected; and
wherein a change speed of the electrical power supply is selected at a respective start in dependence on at least one of the vehicle speed, the steering angle speed, the angle of rotation of the steering wheel, and the transverse acceleration.

2. A power steering system in accordance with claim 1, wherein the controller starts a supply of electrical power to the actuator on a detected change of the steering angle speed starting from the value of zero.

3. A power steering system in accordance with claim 1, wherein the change speed of the electrical power supply is selected to be higher at the respective start at relatively higher vehicle speeds than at relatively lower vehicle speeds.

4. A power steering system in accordance with claim 1, wherein a specific time duration can be preset within which the electrical power supply of the actuator can be coordinated with presettable system parameters after the respective start.

5. A power steering system in accordance with claim 1, wherein at a vehicle speed greater than zero, the electrical power supply of the actuator is modified as soon as an angle of rotation of the steering wheel of zero is detected.

6. A power steering system in accordance with claim 1, wherein the electrical power supply of the actuator is modified when a steering angle speed of zero and a vehicle speed of zero are detected.

7. A power steering system for a vehicle comprising:
an actuator operable by a controller and associated with a torsion bar connected to a steering wheel, by which a torsional stiffness of the system is variable in dependence on at least one of a vehicle speed, a steering angle speed and a transverse acceleration;
an electrical power supply of the actuator is modified when a steering angle speed of zero is detected; and wherein the electrical power supply of the actuator is only modified after a presettable time duration on a detected steering angle speed of zero.

8. A power steering system in accordance with claim 7, wherein on a detected steering angle speed of zero, the time duration after which the power supply is modified can be selected to be longer for relatively lower vehicle speeds than for relatively higher vehicle speeds.

9. A power steering system in accordance with claim 7, wherein the actuator is further defined as one of a magnetic and electromagnetic actuator.

10. A power steering system in accordance with claim 7, wherein the electrical power supply of the actuator is modified when a steering angle speed of zero and a vehicle speed of zero are detected.

11. A power steering system for a vehicle comprising:
an actuator operable by a controller and associated with a torsion bar connected to a steering wheel, by which a torsional stiffness of the system is variable in dependence on at least one of a vehicle speed, a steering angle speed and a transverse acceleration;
an electrical power supply of the actuator is modified when a steering angle speed of zero is detected; and
wherein the modification of the electrical power supply to the actuator is further defined as being interrupted.

12. A power steering system for a vehicle comprising:
an actuator operable by a controller and associated with a torsion bar connected to a steering wheel, by which a torsional stiffness of the system is variable in dependence on at least one of a vehicle speed, a steering angle speed and a transverse acceleration;
an electrical power supply of the actuator is modified when a steering angle speed of zero is detected; and
wherein the modification of the electrical power supply to the actuator is further defined as being reduced.

* * * * *